(12) United States Patent
Ko

(10) Patent No.: US 11,116,239 B2
(45) Date of Patent: Sep. 14, 2021

(54) ASSEMBLED MATERIAL TUBE OF HOT AND COLD FOODS SUPPLYING MACHINE

(71) Applicant: MAING CHAU ENTERPRISE CO., LTD., Taiwan (CN)

(72) Inventor: Yong-Teng Ko, Taiwan (CN)

(73) Assignee: MAING CHAU ENTERPRISE CO., LTD., Taoyuan (TW)

( * ) Notice: Subject to any disclaimer, the term of this patent is extended or adjusted under 35 U.S.C. 154(b) by 122 days.

(21) Appl. No.: 16/446,619

(22) Filed: Jun. 20, 2019

(65) Prior Publication Data

US 2020/0300549 A1 Sep. 24, 2020

(30) Foreign Application Priority Data

Mar. 19, 2019 (TW) .................................. 108203312

(51) Int. Cl.
| | | |
|---|---|---|
| A23G 9/28 | (2006.01) | |
| F28D 7/00 | (2006.01) | |
| F28F 27/00 | (2006.01) | |
| A23G 9/22 | (2006.01) | |
| F28D 21/00 | (2006.01) | |

(52) U.S. Cl.
CPC ............. *A23G 9/281* (2013.01); *A23G 9/228* (2013.01); *F28D 7/0075* (2013.01); *F28F 27/00* (2013.01); *F28D 2021/0042* (2013.01)

(58) Field of Classification Search
CPC .................. F28D 7/0075; F28D 27/00; F28D 2021/0042; A47J 31/50; A23G 9/228; A23G 9/281
See application file for complete search history.

(56) References Cited

U.S. PATENT DOCUMENTS

| | | | | | |
|---|---|---|---|---|---|
| 3,369,596 A | * | 2/1968 | *Maeland | ......... | B01F 15/00012 165/64 |
| 3,724,235 A | * | 4/1973 | Carpigiani | ............. | A23G 9/228 165/61 |
| 5,463,878 A | * | 11/1995 | Parekh | ..................... | A23G 9/28 222/146.6 |

(Continued)

FOREIGN PATENT DOCUMENTS

| | | | | |
|---|---|---|---|---|
| JP | 63108192 A | * | 5/1988 | ........... F28D 7/0008 |
| TW | M332382 | | 5/2008 | |
| TW | M500228 B | | 5/2015 | |

*Primary Examiner* — Devon Russell
(74) *Attorney, Agent, or Firm* — Michael D. Eisenberg

(57) ABSTRACT

The present invention relates to an assembled material tube of hot and cold foods supplying machine, including a plurality of material tube bodies, in which penetrating feed channels are provided internally; each of the material tube bodies has a cooling channel provided with an inlet and an outlet to respectively and correspondingly input and output a working fluid through the cooling channel for performing thermal exchanges, whereby cooling occurs in segmentations for each of the feed channels; a plurality of temperature measurement units each of which is provided with a detecting end for detecting a temperature in the corresponding feed channel; and a plurality of heating units perform heating in segmentations for each of the feed channels. Accordingly, said machine can be separately used as hot food supplying machine or cold food supplying machine, so as to achieve the aim of using one machine for two purposes.

10 Claims, 6 Drawing Sheets

(56) References Cited

U.S. PATENT DOCUMENTS

| | | | | |
|---|---|---|---|---|
| 5,884,501 A | * | 3/1999 | Goldstein | A23G 7/02 |
| | | | | 165/147 |
| 6,263,957 B1 | | 7/2001 | Chen et al. | |
| 9,289,006 B2 | * | 3/2016 | Cocchi | A23L 3/005 |
| 9,693,571 B2 | * | 7/2017 | Cocchi | A23G 9/16 |
| 9,750,268 B1 | | 9/2017 | Thomas | |
| 2011/0088869 A1 | * | 4/2011 | Wadle | A23G 9/22 |
| | | | | 165/64 |
| 2012/0251697 A1 | * | 10/2012 | Cocchi | A23G 9/28 |
| | | | | 426/521 |
| 2017/0130880 A1 | * | 5/2017 | Kempf | F16L 23/003 |
| 2018/0064133 A1 | * | 3/2018 | Jones | A23G 9/06 |
| 2018/0289035 A1 | * | 10/2018 | Cocchi | F25B 39/00 |

\* cited by examiner

ASSEMBLED MATERIAL TUBE OF HOT AND COLD FOODS SUPPLYING MACHINE

CROSS REFERENCES TO RELATED APPLICATIONS

The present application claims priority from Taiwanese Patent Application Serial Number 108203312, filed Mar. 19, 2019 the disclosure of which is hereby incorporated by reference herein in its entirety.

BACKGROUND OF THE INVENTION

(a) Field of the Invention

The present invention relates to an assembled material tube structure capable of heating and cooling in segmentations.

(b) Description of the Prior Art

Generally, the integral structure and manufacturing principle of cold (drinks) foods supplying machines and hot (drinks) foods supplying machines which are commercially available are not consistent. Therefore, these machines cannot be used interchangeably; that is, the same machine cannot serve two purposes, which is the major disadvantage of the machines.

For example, in R.O.C. Utility Model Patent No. M332382 "EVAPORATOR OF ICE-PRODUCT MANUFACTURING MACHINE" published on 21 May 2008, it discloses that: an annular entity having a central hole formed thereto, in which a hollow interval is formed internally in the annular entity, the annular entity has two sides thereof respectively provided with a refrigerant outlet and a refrigerant inlet, and the refrigerant outlet and the refrigerant inlet are in communication with the interval; accordingly, a refrigerant is enabled to flow in the interval and perform more efficient cold and thermal conductions and exchanges with an ice bucket placed in an internal cylinder directly via a cylinder wall of the internal cylinder, thereby increasing the freezing effect on iced products in the ice bucket.

The prior invention enables cold and thermal conductions and exchanges to occur with a large area of the ice bucket directly via the cylinder wall of the internal cylinder; therefore, the cold conductions is effective. However, because a hollow interval is formed internally in the annular entity, once applied to hot foods manufacturing, the hollow space forms an insulated region for heat sources (equivalent to a thermal insulation pot structure for thermal insulation in vacuum), which does not enable heating on hot foods by thermal conductions and therefore cannot be used to make hot (drinks) foods. Further, the prior invention cannot perform heating or cooling in segmentations according to the actual temperature changes and requirements for cold (drinks) foods.

In addition, in R.O.C. Utility Model Patent No. M500228 "MULTIFUNCTIONAL PROCESSING MACHINE" published on 1 May 2015, it discloses that: comprising: a machine body having internally a material storage tank and a processing tank, wherein a feeding port is present between the material storage tank and the processing tank, and a raw material stored in the material storage tank is output to the processing tank via the feeding port after stirring; a refrigerant refrigeration device provided internally in the machine body and covering over the processing tank, wherein the refrigerant refrigeration device is capable of reducing a temperature in the processing tank after being driven, so as to perform refrigeration processing on the raw material in the processing tank; an annular heating device provided internally in the machine body and covering over the processing tank, wherein the annular heating device is capable of increasing a temperature in the processing tank after being driven, so as to perform heating processing on the raw material in the processing tank; a discharge tube connected to the machine body, wherein a processing tank port is present between the discharge tube and the processing tank, and after the raw material in the processing tank is processed into a product, the product is output to an external portion of the machine body via the processing tank port and a discharge port of the discharge tube; a discharge rod connected to the machine body, wherein the discharge rod is controlled to enable the processing tank port to be closed or opened, when the processing tank port is opened, the discharge tube is in communication with the processing tank so as to enable the product to be output out of the machine body; and a heat dissipation device provided internally in the machine body for dissipating heat in the machine body.

Although the prior invention is a multifunctional processor capable of performing cooling or heating, the outer wall of the processing tank in the prior invention has a plurality of semi-circular concave portions formed thereon for refrigerant tubes of the refrigerant refrigeration device to be embedded; since there are only semi-circular contact surfaces present between the refrigerant tubes and the concave portions, the efficiency of thermal exchanges is poor due to the small contact areas therebetween. Moreover, the heating device only covers he periphery of the processing tank, which cannot perform heating in segmentations on the processing tank. Therefore, the prior invention cannot perform heating or cooling in segmentations according to the actual temperature changes and requirements for cold (drinks) foods, subsequently causing the use to be far from ideal.

SUMMARY OF THE INVENTION

In light of the above-mentioned disadvantages of the currently available cold and hot (drinks) foods supplying machine, the present invention provides an assembled material tube of hot and cold foods supplying machine, including a plurality of material tube bodies, wherein each of the material tube bodies is respectively and internally provided with a penetrating feed channel; each of the material tube bodies has a cooling channel circularly provided around the feed channel thereof, wherein each of the cooling channels has two ends thereof respectively formed into an inlet and an outlet, so as to respectively correspond to input and output of a working fluid; a plurality of heating units corresponding to a quantity of the material tube bodies and fixed to the material tube bodies respectively; the material tube bodies are mutually and serially connected in assembly, such that each of the feed channels are mutually communicated; the cooling channel of each material tube body enables the working fluid to flow therethrough and the feed channel is configured to be heated by a corresponding one of the heating units, so as to enable each of the material tube bodies serially connected in assembly to use the working fluid for reducing temperature and the heating unit for heating.

Preferably, each of the material tube bodies is provided with a temperature measurement unit, wherein the temperature measurement unit is provided with a detecting end, and the detecting end is correspondingly extended into the feed channel so as to detect a temperature in the feed channel.

Preferably, each of the material tube bodies has a surface provided with a first fixing hole, wherein the first fixing hole penetrates into the feed channel, and the temperature measurement unit is fixed in the first fixing hole.

Preferably, the temperature measurement unit is a contact-type thermal sensor.

Preferably, each of the material tube bodies has a surface provided with a second fixing hole, wherein the heating unit is fixed in the second fixing hole.

Preferably, the cooling channel of each material tube body is encompassingly provided in a reciprocal and circuitous manner in a wall around the feed channel and along an axial direction of the feed channel.

Preferably, each of the material tube bodies has at least one end thereof being provided with a joining portion, wherein the joining portion is provided with a plurality of screw holes, and two joining portions between two adjacently joined material tube bodies are fixed by screwing a plurality of screw elements into the screw holes.

Preferably, each of the material tube bodies serially connected in assembly has outer most two ends thereof respectively defined with an input end and an output end.

Preferably, the joining portion of each material tube body is configured as a flange.

Preferably, the working fluid is a refrigerant or a coolant.

Preferably, the inlet of each cooling channel has a respective capillary tube connected thereto for inputting the working fluid.

Preferably, the outlet of each cooling channel has a respective refrigerant tube connected thereto for outputting the working fluid.

Preferably, the heating units are respectively and transversely disposed at a middle position or a near-middle position of the material tube bodies relative to an axial direction of the material tube bodies.

Preferably, the cooling channel of each of the material tube bodies include a plurality of axial cooling channels and a plurality of communicating cooling channels, wherein the axial cooling channels are directly drilled into the corresponding material tube body, and two adjacent axial cooling channels have portions thereof in a position close to the input end or in a position close to the output end being connected and therefore communicated to each other through one of the communicating cooling channels, in which the communicating cooling channels close to the input end and the communicating cooling channel close to the output end are distributed in a an alternate manner on an annulus of the corresponding material tube body.

The above-mentioned technical features preferably have the following advantages:

1. Each material tube body has an independent cooling channel and uses a working fluid such as a refrigerant for reducing a temperature in the material tube body, and each material tube body also has an independent heating unit for heating the material tube body; therefore, a working temperature of each material tube body can be independently controlled to enable food materials, iced products or drinks to be subjected to multiple heating or refrigeration modes including "gradual temperature increase", "separate temperature synchronization", "gradual temperature decrease", "intermittent temperature increase", and "intermittent temperature decrease" when passing through an assembled material tube;
2. Capable of precisely and directly detecting actual temperature changes of hot foods or cold foods, and further applying, according to a usage requirement for making hot and cold foods, heating or cooling in segmentations to the assembled material tube, so as to enable the hot foods or the cold foods to reach an optimal intake status;
3. Capable of easily implementing the use of one machine for two purposes due to the fact that the assembled material tube can be freely switched to a heating mode or a refrigeration mode in order to be respectively served as a hot food supplying machine or a cold food supplying machine for foods or drinks like porridges, hot soups, hot tea, boiled herbal jelly, soy milk and the like; by using the assembled material tube for maintaining temperature or heating, foods or drinks can be heat insulated; when applied to drinks or iced products like cold drinks, ice cream, smoothies, milk shakes and the like, the icy sensation of the drinks or the iced products can be ensured by the low temperature of the assembled material tube, which is highly convenient and practical, while at the same time capable of significantly saving purchase costs;
4. The cooling channel of each material tube body are encompassingly provided, along the axial direction of the feed channel, around the feed channel in a reciprocal and circuitous manner, thereby significantly improving the thermal exchange efficiency of the assembled material tube.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
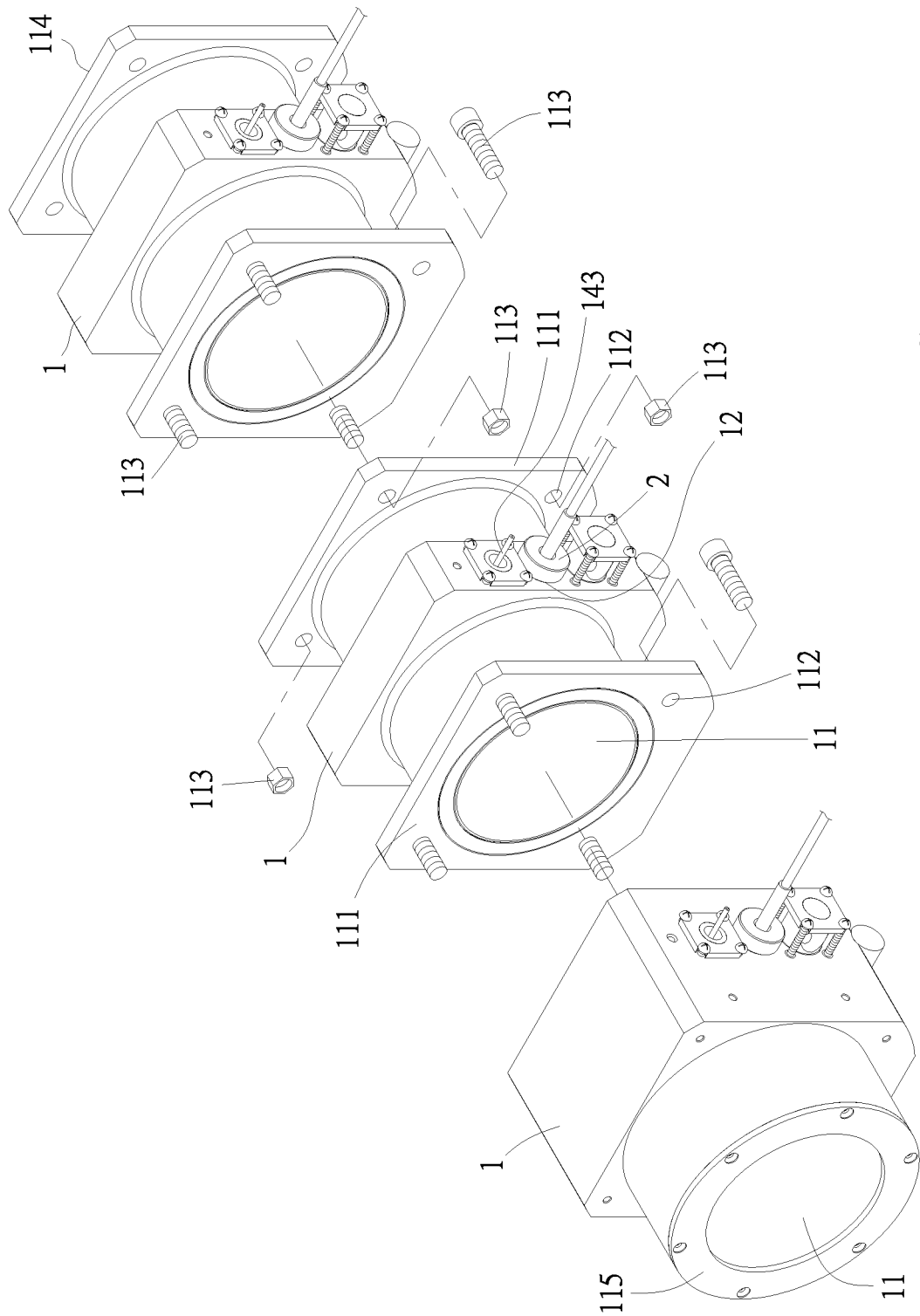
FIG. 1 is a three-dimensional exploded view showing an embodiment according to the present invention.
Figure 2:
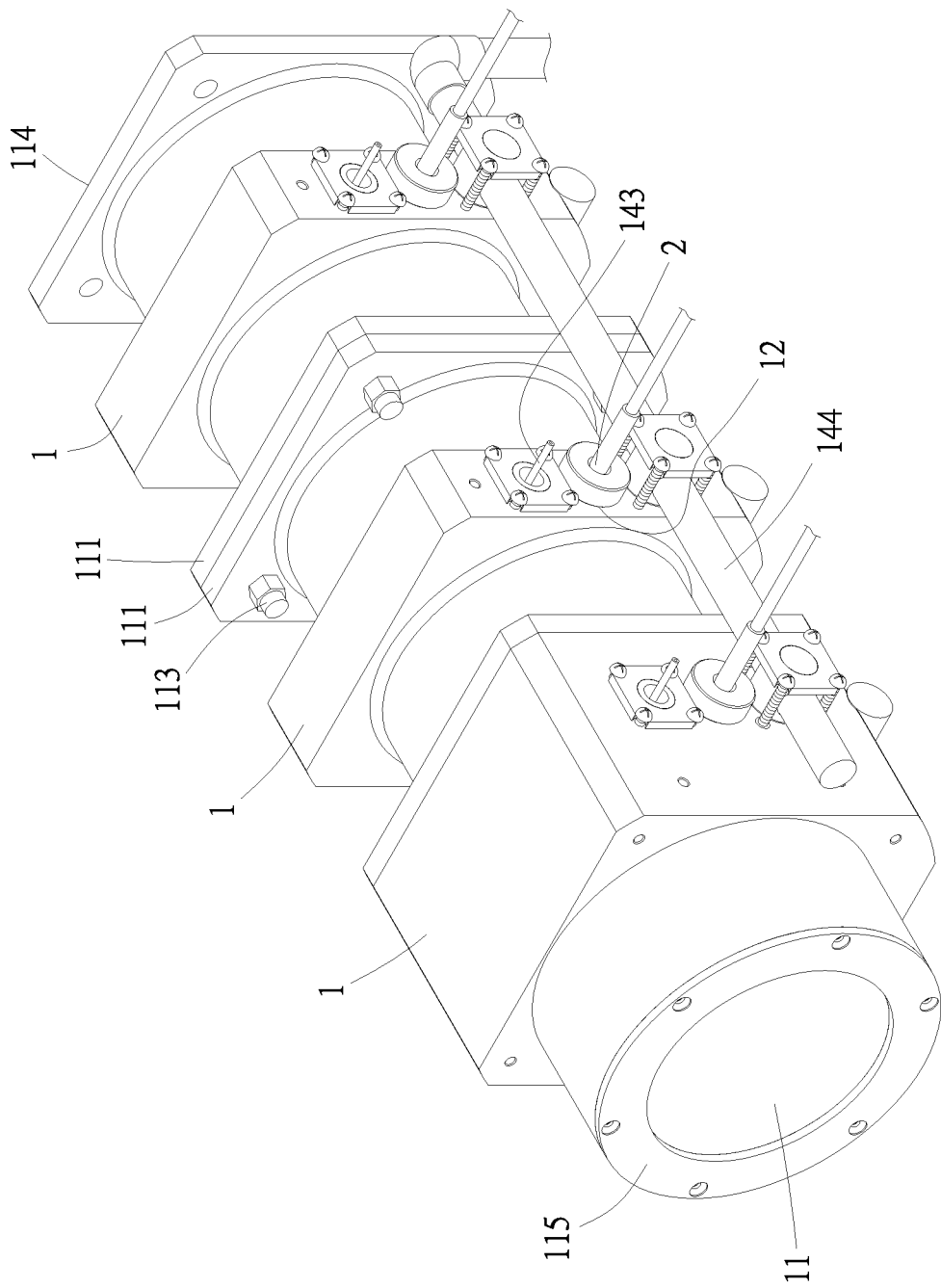
FIG. 2 is a three-dimensional assembled view showing an embodiment according to the present invention.
Figure 3:
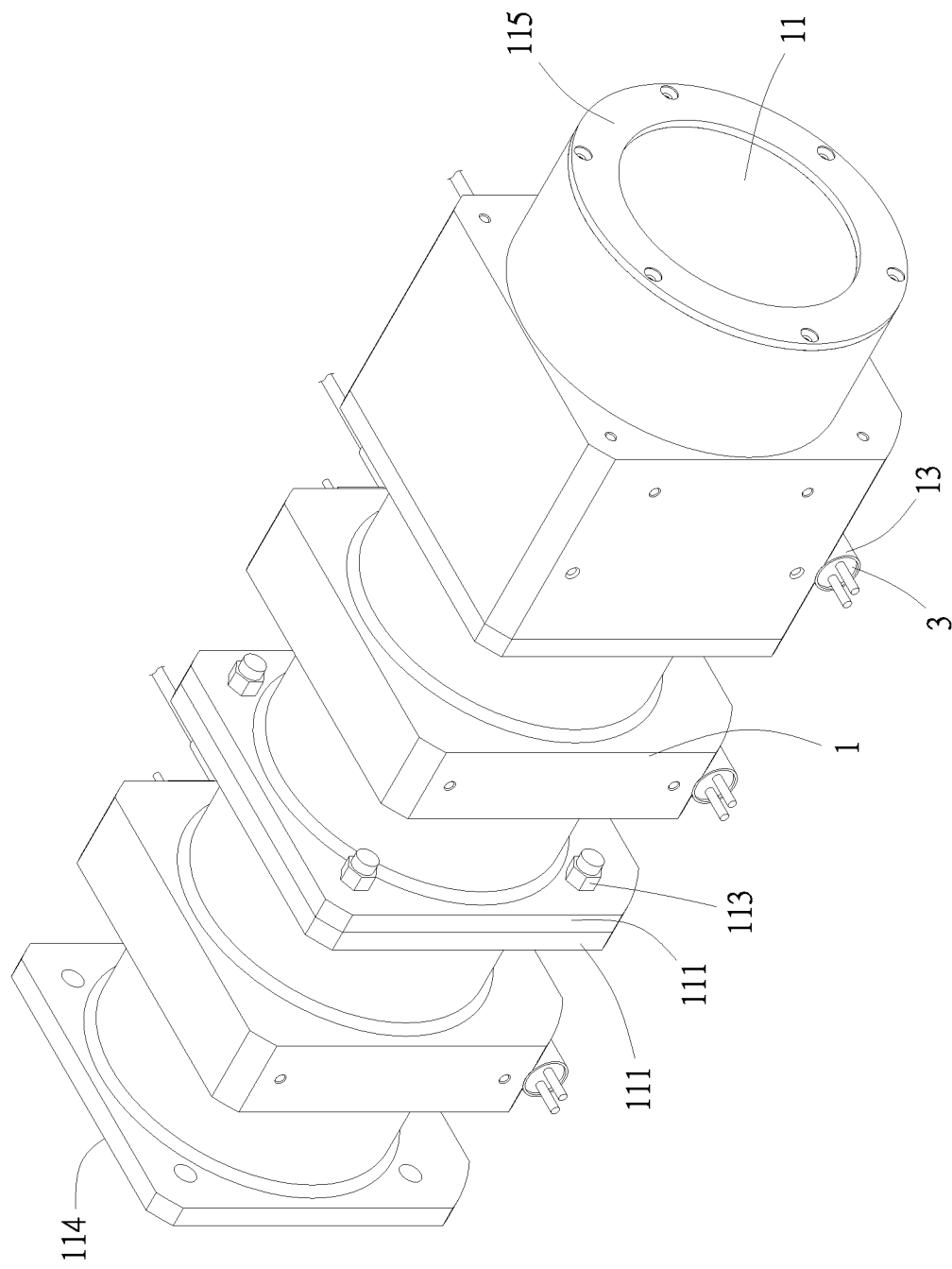
FIG. 3 is a three-dimensional assembled view showing an embodiment from another perspective according to the present invention
Figure 4:
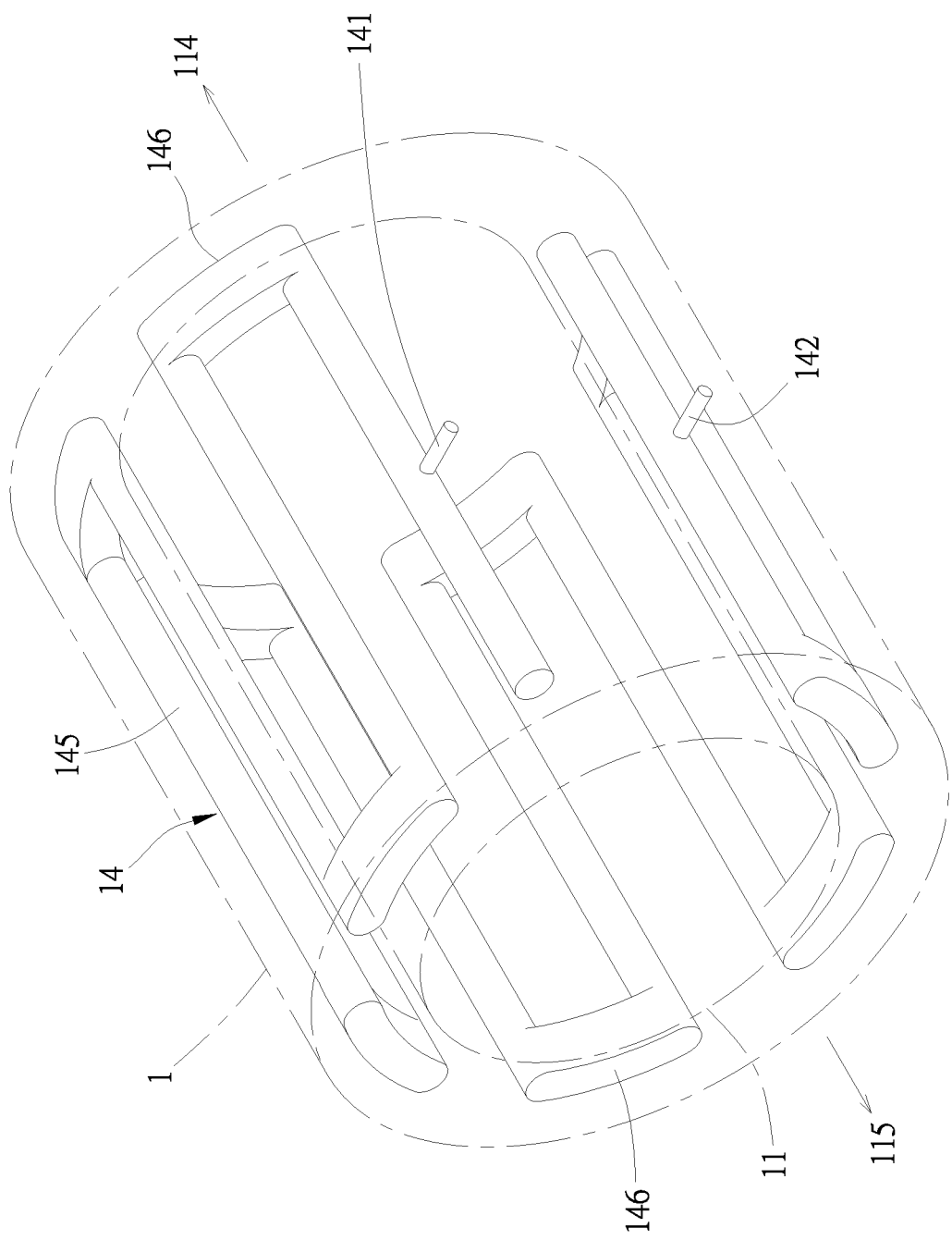
FIG. 4 is a simple schematic view showing cooling channels in an inner wall around a feed channel in an embodiment according to the present invention.
Figure 5:
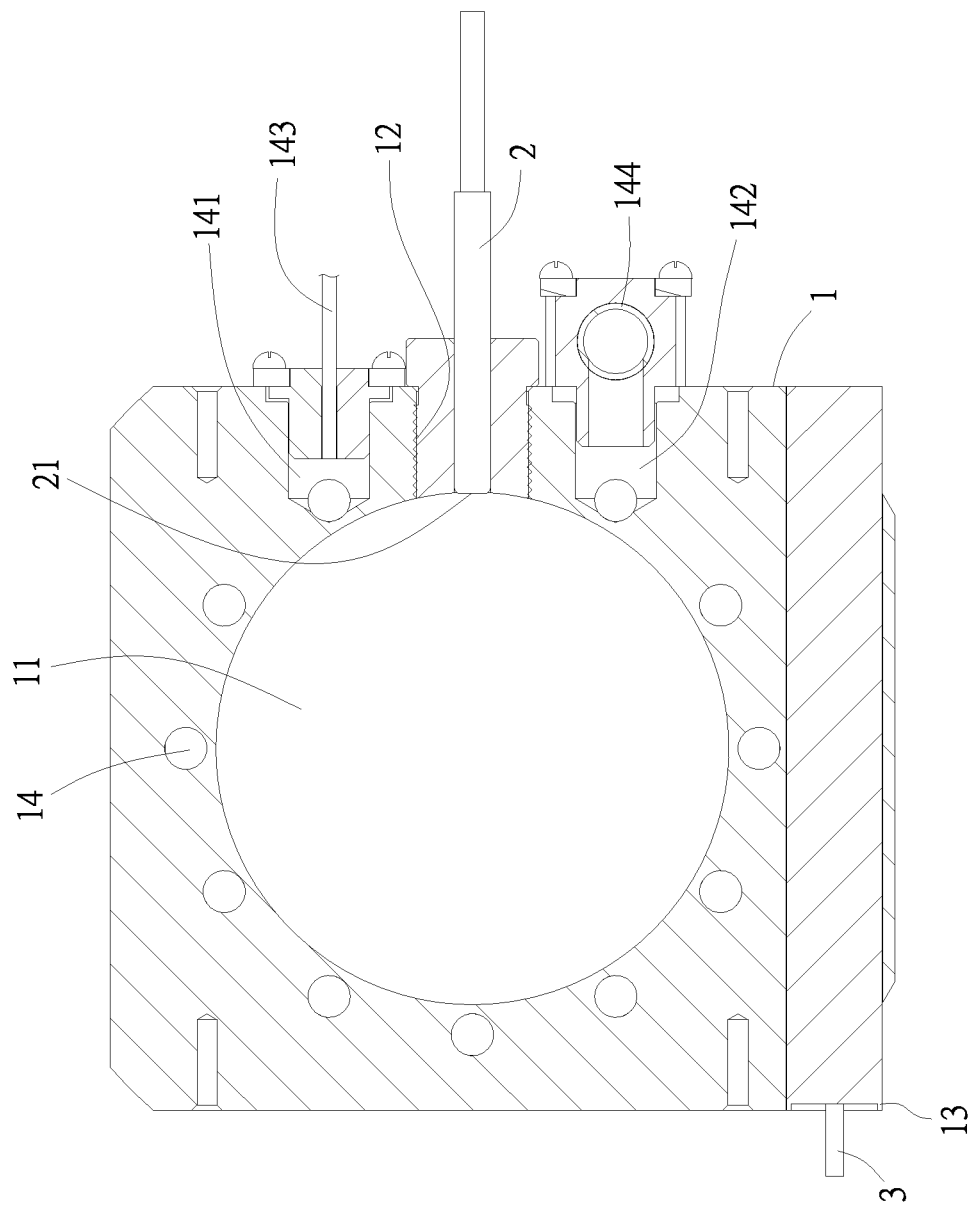
FIG. 5 is a dissected assembly view showing an embodiment according to the present invention.
Figure 6:
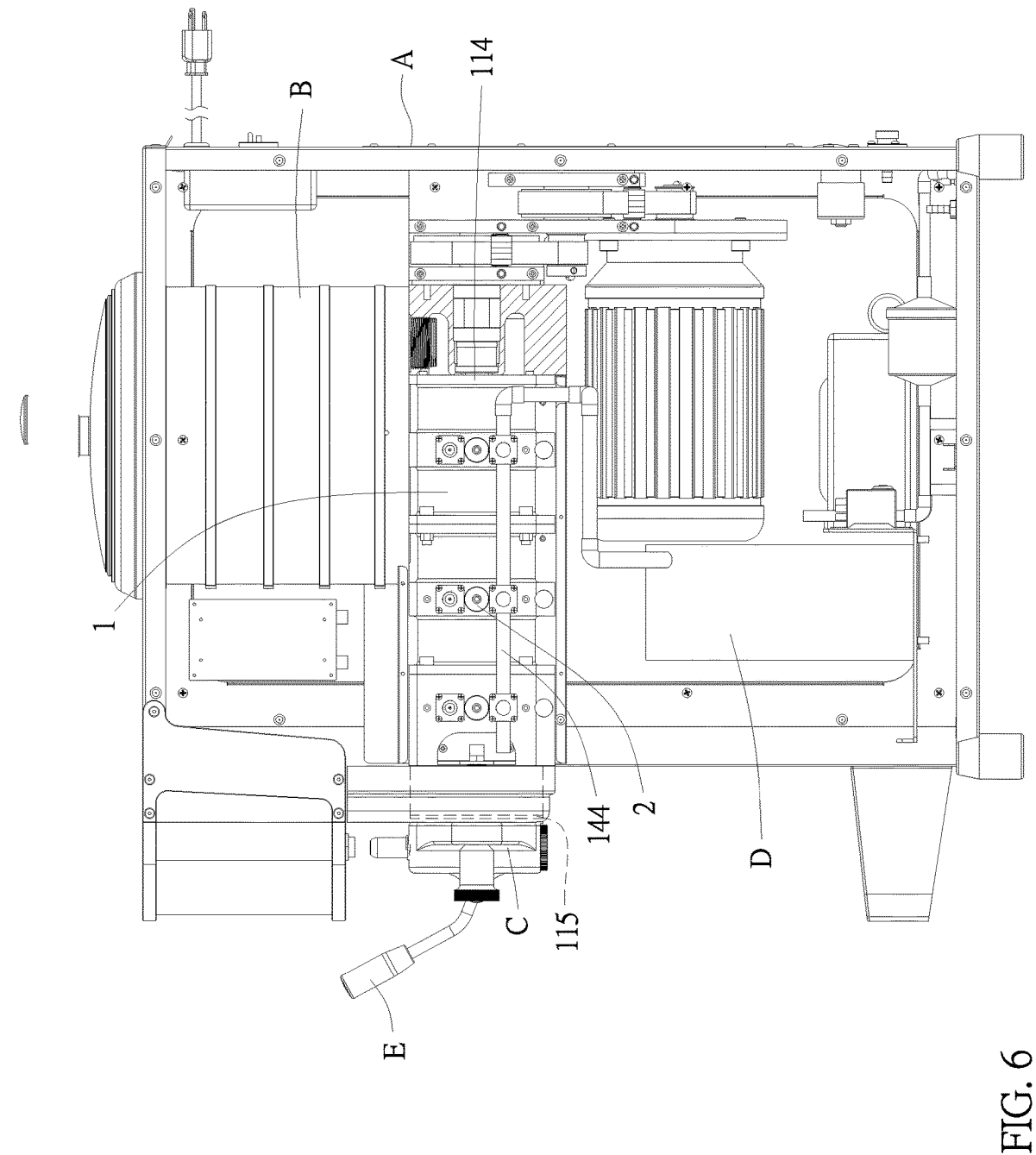
FIG. 6 is a dissected assembly view showing an assembled hot and cold foods supplying machine according to an embodiment of the present invention.

Referring to FIGS. 1, 2 and 3, an embodiment of the present invention includes: material tube bodies (1), a temperature measurement unit (2), and a heating unit (3), wherein:

one or more said material tube body (1) can be selected randomly and serially connected in assembly according to different requirements for temperatures of hot and cold foods to be made or a distance of conveying. In this embodiment of the present invention, three said material tube bodies (1) are serially connected in assembly, and the three material tube bodies (1) can be configured to be different appearances according to different installation spaces; however, the three material tube bodies (1) are substantially structurally identical. Each of the material tube bodies (1) are internally provided with a penetrating feed channel (11), and at least one end of each of the material tube bodies (1) is formed into a joining portion (111), wherein the joining portion (111) is configured as a flange for mutually and serially connecting the material tube bodies (1) in assembly. The joining portion (111) of each of the material tube bodies (1) has a plurality of screw holes (112) provided thereon, so that the joining portions (111) of two adjacent material tube bodies (1) can be joined together by using a plurality of screw elements (113) screwed into the screw holes (112), in which the screw elements (113) consists of screws and nuts. Further, once the material tube bodies (1) are serially connected in assembly, each feed channel (11) is mutually communicated with each other, such that the outer most two ends of an assembled set of the material tube bodies (1) can be respectively defined with an input end (114) and an output end (115). Furthermore, a surface of each of the material tube bodies (1) is respectively provided with a first fixing hole (12) and a second fixing hole (13) (as shown in FIG. 5), wherein the first fixing hole (12) penetrates into the feed channel (11). As shown in FIG. 4, each of the material tube bodies (1) has a cooling channel (14) circularly provided in an inner wall around the feed channel (11), and the cooling channel (14) is encompassingly provided along an axial direction of the feed channel (11) and around the feed channel (11) in a reciprocal and circuitous manner for significantly increasing a thermal exchange efficiency. In addition, the cooling channel (14) has two ends thereof respectively formed into an inlet (141) and an outlet (142) on a surface of the material tube body (1), so as to respectively input and output a working fluid flowing through the cooling channel (14) and uniformly perform thermal exchanges, wherein the working fluid is a refrigerant or a coolant. The inlet (141) is connected to a capillary tube (143) for inputting the working fluid; the outlet (142) is connected to a refrigerant tube (144) for outputting the working fluid to a compressor (D) (as shown in FIG. 6). As shown in FIG. 4, the cooling channel (14) includes a plurality of axial cooling channels (145) and a plurality of communicating cooling channels (146), in which the axial cooling channels (145) are directly drilled into the corresponding material tube body (1), and each two adjacent said axial cooling channels (145) have portions thereof close to the input end (114), or close to the output end (115), being connected together through a respective one of the communicating cooling channels (146), wherein the communicating cooling channel (146) close to the input end (114) and the communicating cooling channel (146) close to the output end (115) are distributed in an alternate manner on an annulus of the feed channel (11), whereby the distributions are made in a reciprocal and circuitous manner for increasing the thermal exchange efficiency.

Each of the material tube bodies (1) is provided with a temperature measurement unit (2) fixed in the first fixing hole (12) thereof (as shown in FIG. 5), wherein the temperature measurement unit (2) has a detecting end (21) directly extended into the feed channel (11) for detecting a temperature in the feed channel (11) of the respective material tube body (1). The temperature measurement unit (2) is a contact-type thermal sensor.

Each of the material tube bodies (1) is provided with a heating unit (3) fixed in the second fixing hole (13) thereof (as shown in FIG. 5), wherein the heating unit (3) is transversely disposed at a middle position, or a near-middle position, of the respective material tube body (1) relative to an axial direction, so as to perform uniform heating on the feed channel (11) of the respective material tube body (1). More specifically, each of the material tube bodies (1) is made of a thermally conductive material so that, when the heating unit (3) performs heating on the material tube body (1), the feed channel (11) can then be heated by means of uniform heat conductions due to the thermally conductive material.

Upon assembly, as shown in FIGS. 1 and 6, the material tube bodies (1) are assembled and fixed in a frame (A), and the input end (114) of the assembled set of material tube bodies (1) is connected to a material barrel (B). Further, the output end (115) of the assembled set of material tube bodies (1) is connected to a discharge valve (C). Furthermore, a rotatable spiral scraper (not shown in the drawing) is provided in the feed channels (11) of the material tube bodies (1), and the refrigerant tubes (144) are connected to the compressor (D).

When being used as a hot food supplying machine for various hot foods such as porridges, hot soups, hot tea, boiled herbal jelly, soy milk, coffee, red bean soup and the like, as shown in FIGS. 1, 5 and 6, the hot foods are firstly placed into the material barrel (B), in which the hot foods can be cooked or formulated in advance, or be supplied by a central kitchen. The heating units (3), after being activated, are enabled to heat the material tube bodies (1) respectively; in addition, the thermal conduction function of the material tube bodies (1) allows the heat generated by the heating units (3) to be uniformly and dispersedly transferred to the inner walls of the feed channels (11). When the hot foods are to be supplied, a handle (E) disposed at the discharge valve (C) is operated such that the spiral scraper rotatingly scrapes and conveys materials in the feed channels (11), so as to enable the hot foods to enter into the feed channels (11) via the input end (114) and to be heated, and then the heated hot foods are output for consumption from the discharge valve (C) via the output end (115). Meanwhile, as the temperature measurement units (2) can directly contact the hot foods in the feed channels (11) of the material tube bodies (1) via their respective detecting ends (21), actual temperature changes of the hot foods in the feed channels (11) of the material tube bodies (1) can be detected separately; then each of the heating units (3) can be controlled, according to a heating requirement, by means of a control unit (not shown in the drawing) so as to generate different heating temperatures, thereby heating the hot foods in the feed channel (11) of different material tube bodies (1) in segmentations, and achieving a most accurate heating temperature by grasping the temperature of the hot foods output via the discharge valve (C).

When being used as a cold food supplying machine for various cold foods such as cold drinks, ice cream, smoothies, milk shakes and the like, as shown in FIGS. 1 and 5, the cold foods or the cold food materials are firstly placed into the material barrel (B), in which the cold foods or the cold food materials can be formulated in advance, or be supplied by a central kitchen. The working fluid having a low temperature is input via the capillary tubes (143) into the cooling channels (14); in the cooling channels (14), the working fluid encompassingly flows in a reciprocal and circuitous manner along the axial direction of the feed channels (11), and then the working fluid is output from the outlets (142) via the refrigerant tubes (144) so as to be returned to the compressor (D) (as shown in FIG. 6). When the cold foods are to be supplied, the handle (E) disposed at the discharge valve (C) is operated such that the spiral scraper rotatingly conveys materials in the feed channels (11), the cold foods then enter into the feed channels (11) via the input end (114), and then output for consumption from the discharge valve (C) via the output end (115). The working fluid is enabled to perform thermal exchanges uniformly with the cold foods when the working fluid encompassingly passes through the periphery of the feed channels (11) in the cooling channels (14), thereby a temperature of the cold foods is reduced and achieving the purpose of making cold foods. Meanwhile, as the temperature measurement units (2) can directly contact the cold foods in the feed channels (11) of the material tube bodies (1) via their respective detection ends (21), actual temperature changes of the cold foods in the feed channels (11) of the material tube bodies (1) can be detected separately; then the capillary tubes (143) can be controlled individually, according to a temperature reduction requirement, by means of the control unit so as to enable the working fluid to enter into the cooling channels (14) for different durations and in different flowing amounts. For example, each of the inlets (141) is provide with a respective control valve (not shown in the figure) so that each of the inlets (141) can be separately controlled to change the duration and flowing amount of the working fluid entering into the respective cooling channel (14), thereby cooling the cold foods in the feed channels (11) of the material tube bodies (1) in segmentations, and achieving a most accurate temperature reduction by grasping the temperature of the cold foods output via the discharge valve (C).

If the above-mentioned cold foods are cold drinks, for example, ice coffee, iced juices, ice tea and the like, the material tube bodies (1) are simply required to be controlled at an adequate working temperature, for example, 5° C. to 15° C., so as to enable the output cold drinks to be kept icy. The cold foods can also be frost cream; a formulated frost cream is poured into the material barrel (B), and then the material tube bodies (1) are controlled at an adequate working temperature, for example, –5° C. to –7° C. The cold foods can also be smoothies; a formulated smoothie raw material is poured into the material barrel (B), and then the material tube bodies (1) are controlled at an adequate working temperature, for example, –10° C. to –20° C., so as to enable the smoothie raw material to be frozen on a wall of the feed channels (11) of the material tube bodies (1) upon outputting, and be scraped off for conveying by using the spiral scraper, finally output for consumption via the discharge valve (C).

Accordingly, the present invention realizes the aim of using one machine for two purposes by using the assembled material tube device, which is capable of being respectively used as a hot food supplying machine or a cold food supplying machine, thereby achieving great convenience and practical uses, and significantly saving purchase costs. By using the segmented structure designed for the material tube, the actual temperature change of hot foods or cold foods in each feed channel (11) can be accurately and directly detected, and further applying, according to a usage requirement for making hot and cold foods, heating or temperature reduction in segmentations to the assembled set of the material tubes, so as to enable the hot foods or the cold foods to reach an optimal intake state.

In summary of the explanations of the above-mentioned embodiments, operations and uses of the present invention and effects produced thereby can be sufficiently understood. However, it should be understood that the aforesaid embodiments are merely preferred embodiments of the present invention and are not intended to limit the scope of the present invention; therefore, simple alterations and equivalent modifications based on the claims and the description of the present invention shall be likewise included within the scope of present invention.

What is claimed is:

1. An assembled material tube of hot and cold foods supplying machine, comprising:
   a plurality of material tube bodies, each of the material tube bodies having a feed channel penetrating therethrough and a cooling channel circularly provided around a periphery of the feed channel, two ends of the cooling channel of each material tube body being formed into an inlet and an outlet respectively for inputting and outputting a working fluid through the cooling channels; and
   a plurality of heating units corresponding to each material tube body and fixed thereto;
   wherein the plurality of material tube bodies are mutually and serially connected in assembly so that the feed channels thereof are mutually communicated; the cooling channel of each material tube body enables the working fluid to flow therethrough and the feed channel of each material tube body is configured to be heated by a corresponding one of the heating units, thereby allowing the material tube bodies to be cooled and heated by means of the working fluid and the corresponding heating units respectively and separately; in which each of the material tube bodies has outermost two ends thereof respectively defined with an input end and an output end, the cooling channels comprise a plurality of axial channels and a plurality of communicated channels, the axial channels are directly penetrated in the material tube bodies thereof, two of the adjacent axial channels are respectively connected to the communicated channels in positions near the input end and near the output end, the communicated channels near the input end and near the output end are distributed in a criss-cross manner on an annulus, accordingly, the cooling channels are encompassingly provided, along an axial direction of the feed channel of the material tube bodies thereof, in an inner wall around the feed channel in a reciprocal and circuitous manner; the heating units are respectively provided in an axially central position or a position near the center axially on each of the material tube bodies, and each of the material tube bodies is made from a thermally conductive material, so as to enable the heating units to evenly heat the feed channel of the material tube bodies thereof.

2. The assembled material tube of claim 1, wherein each material tube body is provided with a temperature measurement unit, the temperature measurement unit having a detecting end extended into the feed channel of said material tube body to detect a temperature therein.

3. The assembled material tube of claim 2, wherein each material tube body has a surface thereof provided with a fixing hole penetrating into the feed channel of said material tube body for the temperature measurement unit to be fixed therein.

4. The assembled material tube of claim 2, wherein the temperature measurement unit is a contact-type thermal sensor.

5. The assembled material tube of claim 1, wherein each material tube body has a surface thereof provided with a fixing hole containing the heating unit fixed thereto.

6. The assembled material tube of 1, wherein each material tube body has at least one end thereof being provided with a joining portion on which a plurality of screw holes are disposed, and the joining portions of two adjacent said material tube bodies are fixed together by screwing a plurality of screw elements into the screw holes thereof.

7. The assembled material tube of claim 6, wherein the joining portion of each material tube body is configured as a flange.

8. The assembled material tube of claim 1, wherein the working fluid is a refrigerant or a coolant.

9. The assembled material tube of claim 1, wherein the inlet formed on the cooling channel of each material tube body is connected to a respective capillary tube for inputting the working fluid.

10. The assembled material tube of claim 1, wherein the outlet formed on the cooling channel of each material tube body is connected to a respective refrigerant tube for outputting the working fluid.

* * * * *